Figure 1:
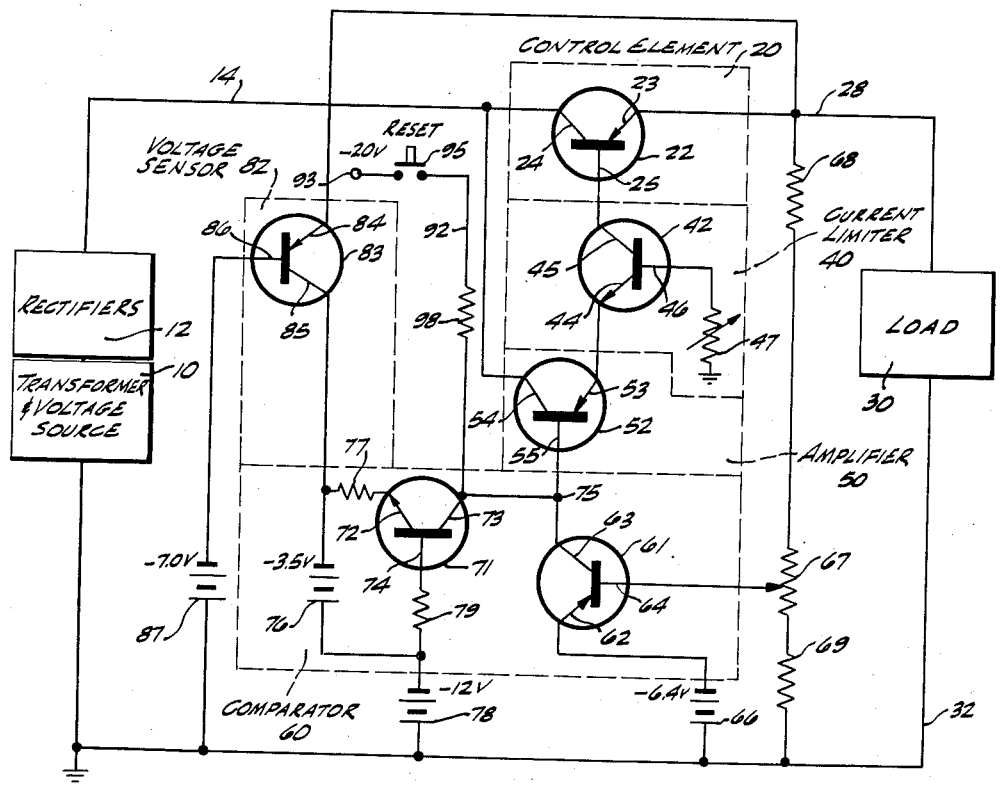

June 19, 1962

F. V. TADDEO 3,040,238

POWER SUPPLY

Filed May 8, 1958

INVENTOR.
FAUSTO V. TADDEO,

BY

Walter J. Adam

ATTORNEY.

United States Patent Office 3,040,238
Patented June 19, 1962

3,040,238
POWER SUPPLY
Fausto V. Taddeo, Anaheim, Calif., assignor to Hughes Aircraft Company, Culver City, Calif., a corporation of Delaware
Filed May 8, 1958, Ser. No. 735,087
8 Claims. (Cl. 323—22)

This invention relates to regulated power supplies and particularly to a transistor power supply including a fast acting overload protection circuit.

In the prior art, D.C. power supplies were used in connection with vacuum tubes and delivered relatively high output voltages and could operate with relatively high output impedances. However, widespread use of transistors in electronic equipment has dictated radical changes in D.C. power supply requirements. For transistor circuitry, power supplies may be required to supply output voltages as low as 1.5 volts D.C. while supplying currents as high as 25 amperes. The output impedance of the power supply may be required to be less than $10^{-3}$ ohms. These problems have been solved by utilizing power supplies with high power transistors for regulation and low forward resistance diodes for rectification.

The low output impedance from these power supplies has created new problems, the most formidable one being that of protecting the power supply and the load against short circuits or accidental overloads. When a power supply having a low output impedance is short circuited or overloaded, extremely high short circuit current flows, causing destruction of the regulating transistors of the power supply and destruction of the rectifiers. Also the transistors of the load may be destroyed. This destruction of the transistors and the rectifiers occurs at a fast rate, the time required for destruction being in the order of 100 microseconds under severe conditions. Conventional fuses or mechanical disconnects require 20 to 30 milliseconds to open, which operation is far too slow to protect transistors. A system which would provide overload protection at sufficient speed to protect all types of circuitry, and which would require a minimum of components for operation would have wide use, especially with transistor circuitry.

It is, therefore, an object of this invention to provide a power supply which rapidly disconnects from its load upon the occurrence of a short circuit.

It is a further object of this invention to provide a transistor power supply which limits the current flow with sufficient speed when an overload current is drawn, to prevent destruction of the transistors in the power supply.

It is still a further object of this invention to provide a power supply utilizing transistors which supplies a high current to a load at a low output impedance and which includes a current limiting arrangement operating automatically to protect transistors of the load against accidental overloads or short circuits and which includes an arrangement to rapidly disconnect the source from the load to protect the power supply against accidental overloads or short circuits.

It is another object of this invention to provide a power supply having an arrangement which maintains a constant output voltage when supplying less than a maximum load current, which limits the load current to the maximum and which disconnects the power supply from the load when required to supply more than the maximum load current.

According to one feature of this invention, a power supply receives unregulated D.C. voltage from a transformer and rectifier arrangement and supplies it to a load through a series-connected control transistor which varies in static impedance in response to changes of its base current. A current limiter transistor which is normally biased to act in its saturated region, has its load current path connected to the base of the control transistor. An amplifier transistor is connected to the load current path of the current limiter transistor to pass current therefrom. A comparator is connected to the base of the amplifier transistor, the comparator being controlled by the potential at the load output of the control transistor to operate when the output potential is less than a fixed maximum. Thus, a servo loop is provided to control the amplifier transistor which in turn controls the current through the base of the control transistor to maintain a constant output voltage. When a maximum current is required by the load, as with a short circuit for example, the current limiting transistor operates in its unsaturated region and passes a constant current from the base of the control element transistor, thus causing the control element transistor to act to limit the load current to protect the load from destruction. This limiting of the load current allows the output potential to become more positive. A voltage sensor transistor is provided to compare this output potential with a reference voltage representing the fixed maximum output potential, and to respond when they are approximately equal in value. When the voltage sensor transistor responds, the comparator and the servo loop are disconnected from operation. Thus, base current is prevented from passing through the control transistor and the power supply is effectively disconnected from the load.

Figure 2:
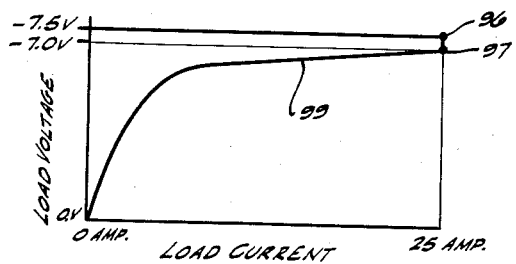

The novel features of this invention, as well as the invention itself, both as to its organization and method of operation, will best be understood from the accompanying description, taken in connection with the accompanying drawing, in which like reference characters refer to like parts, and in which:

FIG. 1 is a schematic circuit diagram of the power supply of this invention; and FIG. 2 is a graph to illustrate the operation of the circuit of FIG. 1.

Referring first to FIG. 1, a schematic circuit diagram is shown of the power supply circuit including the overload protection arrangement of this invention. The power supply of this invention receives unregulated voltage from an arrangement of a transformer and voltage source 10 and a rectifier 12 and supplies power through a control element 20, which may include a control transistor 22 of the p-n-p type, to a load 30. It is to be noted that the power supply of FIG. 1 acts as a negative supply referenced to ground potential which is connected to transformer 10. This negative supply arrangement may be used for a computer power supply, for example. However, it is to be expressly understood that this invention may be readily arranged to operate as a positive supply by reversing all voltages and changing the transistor types. The control transistor 22 includes an emitter 23, a collector 24, and a base 25, with the collector 24 connected to the unregulated source line 14 which in turn connects to the rectifier 12. The emitter 23 of the control transistor 22 is connected to the output load line 28 which in turn connects to the load 30. The load 30 is connected to ground potential through a ground potential line 32. As will be discussed, the impedance of the control transistor 22 is varied by controlling the current through its base 25 to maintain a constant output potential applied to output load line 28.

A current limiter 40 may include a current limiter transistor 42 of the n-p-n type which has an emitter 44, a collector 45, and a base 46, and is arranged with its collector 45 connected to the base 25 of the control transistor 22. The base 46 of the current limiter transistor 42 is connected to ground by way of a current adjusting impedance element 47 which, for example, may be an adjustable resistor. As will be discussed, the current limiter transistor 42 acts to limit the current through the base 25 of control transistor 22 causing this transistor to limit the load current through control transistor 22 to a maximum value. An amplifier 50, which may include an amplifier transistor 52 of the p-n-p type, has an emitter 53, a collector 54, and a base 55. The amplifier transistor 52 has its emitter 53 connected to the emitter 44 of the current limiter transistor 42 and its collector 54 connected to the unregulated source line 14. The amplifier transistor 52 acts to control the current which passes through the base 25 of the control transistor 22, and through the collector 45 to the emitter 44 of the limiter transistor 42.

A comparator 60 is provided which may include a first comparator transistor 61 of the p-n-p type, and a second comparator transistor 71 of the n-p-n type. The first comparator transistor 61 has an emitter 62, a collector 63, and a base 64, and the second comparator transistor 71 has an emitter 72, a collector 73 and a base 74. The collector 63 of the first comparator transistor 61 is connected to the base 55 of the amplifier transistor 52. A battery 66 is provided with its negative terminal connected to the emitter 62 of the first comparator transistor 61 and with its positive terminal connected to ground. The base 64 of the first comparator transistor 61 is connected to a variable voltage regulator resistor 67, one end of which is connected to the output load line 28 by way of a first dropping resistor 68. The other end of the voltage regulator resistor 67 is connected to ground by way of a second dropping resistor 69. Thus the potential on the output load line 28, which is referenced to ground potential, acts to vary the current through the first comparator transistor 61.

A battery 76 and a battery 78 are provided to bias second comparator transistor 71. The collector 73 of the second comparator transistor 71 is connected to the collector 63 of the first comparator transistor 61 at a junction 75, and the emitter 72 of the second comparator transistor 71 is connected to the negative terminal of the battery 76 by way of a current controlling resistor 77. The positive terminal of the battery 76 is connected to the negative terminal of the battery 78, the positive terminal of which is connected to the ground line 32. The base 74 of the second comparator transistor 71 is connected to the negative terminal of the —12 volt battery 78 by way of a current limiting resistor 79.

Thus, both the base current from the amplifier transistor 52 and the emitter-collector-current from the first comparator transistor 61 pass through the second comparator transister 71 to a potential at the negative terminal of the battery 76. The second comparator transistor 71 is normally biased into conduction from the potential connected to its base to the potential connected to its emitter. As will be discussed, the second comparator transistor 71 when conducting, passes a constant current.

A voltage sensor 82, which may include a voltage sensor transistor 83 of the p-n-p type, has an emitter 84, a collector 85, and a base 86, the voltage sensor transistor 83 being provided to bias the second comparator transistor 71 out of operation. The collector 85 of the voltage sensor transistor 83 is connected to the negative terminal of the battery 76 and is connected to the emitter 72 of the second comparator transistor 71 by way of the current controlling resistor 77. A battery 87 is provided as a reference voltage with its negative terminal connected to the base 86 of the voltage sensor transistor 83. The positive terminal of battery 87 is connected to ground. The emitter 84 of the voltage sensor transistor 83 is connected to the output load line 28. When the potential on the output load line 28 increases to approximately —7.0 volts, as will be discussed, voltage sensor transistor 83 is biased into conduction and the potential on the output load line 28 is impressed onto its collector 85. This potential on the output load line 28 shorts out the potential impressed on the emitter 72 of the second comparator transistor 71 from the battery 76, and biases the second comparator transistor 71 out of conduction. Thus the voltage sensor transistor 83 is biased into conduction and the second comparator transistor 71 is biased out of conduction when the potential on the output load line 28 rises to approximately —7.0 volts. As will be discussed, biasing the second comparator transistor 71 out of conduction, prevents control transistor 22 from conducting load current, thus disconnecting the load 30 from the unregulated source line 14. A reset arrangement is provided by a reset line 92 connected from the collector 73 of the second comparator transistor 71 to a voltage source 93 by way of a current limiting resistor 98 and a reset button 95.

While it will be understood that the circuit specification of the power supply of the invention may vary according to the design of any particular application, the following circuit specifications for a power supply are included, by way of example only, suitable to supply a regulated voltage of —7.5 volts at a maximum load current of 25 amperes:

| | | |
|---|---|---|
| Transistor 22, Delco-Remy | | 2N277 |
| Transistor 42, C.B.S. Hytron | | 2N182 |
| Transistor 52, Raytheon | | 2N114 |
| Transistor 61, Raytheon | | 2N114 |
| Transistor 71, General Electric | | 2N167 |
| Transistor 83, General Electric | | 2N123 |
| Battery 66 | volts | —6.4 |
| Battery 76 | do | —3.5 |
| Battery 79 | do | —12 |
| Battery 87 | do | —7.0 |
| Resistor 67 | ohms | 250 |
| Resistor 68 | do | 82 |
| Resistor 69 | do | 910 |
| Resistor 77 | do | 1000 |
| Resistor 79 | do | 22,000 |
| Resistor 98 | do | 4,700 |
| Impedance element 47 | do | 52,200 |

In operation, the control transistor 22 varies in impedance to maintain a desired potential on the output load line 28 of —7.5 volts. The current limiter transistor 42 is biased by the current adjusting impedance element 47 to operate in its saturated region when the load current passed through the output load line 28 is below a predetermined maximum of 25 amperes. While operated in its saturated region, the current limiter transistor 42 is effectively a closed circuit, only acting to add a few ohms series resistance to the control current passing through the base 25 of the control transistor 22. The control current through the base 25 of the control transistor 22 passes through the amplifier transistor 52 to the unregulated source line 14 as determined by the current through the base 55 of the amplifier transistor 52. The first comparator transistor 61 responds to changes of potential on the output load line 28 to vary the current passed to the junction 75 at its collector 63. Since the second comparator transistor 71 normally acts to pass a constant current from its collector 73 to emitter 72, varying the current through the collector 63 of the first comparator transistor 61 acts as a short circuit to vary the base current of the amplifier transistor 52. An increase of potential (a potential rise toward ground potential) on the output load line 28 acts to decrease the current through the emitter-collector path of the first comparator transistor 61, resulting in an increase of base current from the amplifier transistor 52 and an increase of control current through the base 25 of the control transistor 22. Thus the impedance of the control transistor 22 is decreased to provide a decrease of potential (a potential drop below ground potential) on the output load line 28 in order to compensate for the original increase of potential on the output load line 28. A decrease of potential on the output load line 28 is corrected by an opposite action. This arrangement acts as a servo loop to maintain the desired potential of −7.5 volts on the output load line 28.

When the load current through the output load line 28 reaches a fixed maximum, which in this circuit is 25 amperes, the control current through the base 25 of the control transistor 22 and through the collector-emitter path of the current limiter transistor 42 has increased to cause the current limiter transistor 42 to operate out of its saturation region. Under this condition, the current limiter transistor 42 operates as a constant current element to pass a constant control current from the base 25 of control transistor 22, and limit the current passed through the load 30. When the current through the base 25 of control transistor 22 is constant, this transistor characteristically acts as a high impedance element to increases of load current. Thus, control transistor 22 acts as a constant current element to load current with the potential on output load line 28 increasing with an increase of impedance of control transistor 22 resulting from an attempt of load 30 to draw more current. This increase of potential on the output load line 28 may result from a short circuit in the load 30, for example. An increase of potential on the output load line 28 to −7.0 volts for the circuit specifications given which potential is impressed on the emitter 84 of the voltage sensor transistor 83, biases the voltage sensor transistor 83 into conduction. The potential on the output load line 28 is therefore referenced to the −7.0 volts of battery 87 connected to the base 86 of voltage sensor transistor 83. When the voltage sensor transistor 83 is biased into conduction, the −7.0 volts on the output load line 28 is impressed upon its collector 85 to bias the second comparator transistor 71 out of conduction. As discussed, the second comparator transistor 71 is normally conducting with a −15.5 volts at the negative terminal of the battery 76, but the −7.0 volts impressed through the voltage sensor transistor 83 acts to effectively short out the more negative potential of −15.5 volts. When the second comparator transistor 71 is biased out of conduction, current is prevented from passing through the base 55 of the amplifier transistor 52, preventing it from conducting. Thus the flow of control current through the base 25 of the control transistor 22 is prevented and the impedance of the control transistor 22 is greatly increased. The flow of current passing through the load output line 28 is prevented and the unregulated source line 14 is disconnected from the output load line 28.

This condition with the control transistor 22 biased out of conduction and the voltage sensor transistor 83 conducting continues until the reset switch 95 is momentarily closed. Closing the reset switch 95 connects the junction 75 and the collector 63 of the first comparator transistor 61 to the −20 volt terminal 93 through a current limiting resistor 98. This condition allows current to pass through the base 55 of the amplifier transistor 52 and allows current to pass from the base 25 of the control transistor 22 to start current flow through the control transistor 22 to the load 30. Therefore, momentarily closing the reset switch 95 permits again regulated operation of the power supply.

Referring now to FIG. 2 which is a graph of output voltage vs. load current illustrating the operation of the circuit, and also referring to FIG. 1, the action of the circuit will be further explained. The normal operating range of the power supply exists as long as the power supply is maintaining −7.5 volts on the output load line 28 with a load current of less than 25 amperes. In this normal operating range, the current limiter transistor 42 is operating in its saturation region, acting essentially as a closed circuit between its collector 45 and emitter 44. When the load current increases to 25 amperes the current limiter transistor 42 begins its operation as a constant current element, causing the power supply to operate in a constant current mode, that is, to supply a constant current to the load 30. This constant current mode of operation occurs between a point 96 and a point 97 of the graph of FIG. 2 as the potential on output load line 28 increases.

If the servo loop and the comparator 60 were allowed to continue operation and the control transistor 22 were allowed to continue passing a constant control current through its base 25, the operation of the power supply would continue to supply 25 amperes to the load. The voltage on the output load line 28 would rise to approximately 0 volts depending upon the short-circuit condition. At this constant current mode of operation, the load is fully protected from overload current, since the current limiter transistor 42 absolutely prevents an increase of current above maximum. However, if an increased voltage were allowed to continue across the control transistor 22 of the power supply, this transistor would be rapidly destroyed. When the voltage on the output load line 28 increases in positive potential to −7.0 volts the voltage sensor transistor 83 is biased into conduction. As discussed, the second comparator transistor 71 is biased out of conduction and the control current is prevented from passing through the base 25 of the control transistor 22. The control transistor 22 is thus biased out of conduction to stop the conduction of load current, which condition causes the load voltage to return from the point 97 to an approximately zero volt value along line 99. In this condition with no current passing to the load the unregulated source line 14 is disconnected from the output load line 28 and the circuitry of the power supply is protected from being destroyed.

Since the time required to disconnect the power supply is limited only by the carrier storage time of the transistors, such as the control transistor 22, the voltage sensor transistor 83, and the second comparator transistor 71, the power supply is returned to its zero current condition in approximately 10 microseconds. This short period for disconnecting the unregulated source line 14 from the load 30 protects the power supply against destruction and also prevents undesired operation of load circuitry at a higher than the desired regulated voltage as, for example, in a condition of a partial short circuit of the load.

It is to be again noted that because of the constant current mode of operation of the current limiter transistor 40, the current is prevented from increasing above the rated maximum and the transistor circuitry of the load is fully protected from receiving greater than load current. At the load current and output load line voltages of this power supply, transistors have been found to require at least 100 microseconds to be destroyed, thus transistors of the load and the power supply are fully protected by the automatic current limiting and by the rapid disconnecting of the source from the load as provided by this invention. Therefore, the circuit of this invention provides overload protection of both the power supply and the load when supplying a large load current at a low output impedance.

The load current at which the current is limited and at which the disconnecting operation occurs is varied by changing the value of the current adjusting impedance element 47 at the base 46 of the current limiter transistor 42. The regulated potential at the output load line 28 is varied by changing the magnitude of the battery 87 which is the voltage reference. It is to be again noted that although the power supply has been described as supplying negative potentials relative to ground potential, it may be easily arranged to supply positive potential relative to ground potential by reversing all voltages and changing the transistor types.

Thus there has been described a transistor power supply which supplies constant output potential to a load varying up to a rated value. A servo loop and a comparator act to maintain the desired impedance of a control transistor connected in the supply path. A current limiter transistor acts to automatically limit the load current to a rated load, thus protecting the load circuitry. Also when the load current reaches or exceeds rated load, a voltage sensor transistor comes into operation to disconnect the servo loop and the comparator and to act on the control transistor to cause the unregulated source to be disconnected from the load, thus protecting the power supply against overload. Because the disconnecting speed of this circuit is limited only by the carrier storage time of the transistors, the time interval required for disconnecting the unregulated source from the load allows only a short period of operation with greater than the desired output voltage. Therefore, an improved arrangement has been provided which allows utilizing a high current power supply with a low output imepdance while fully protecting both the load and the power supply against accidental overload or short circuit.

What is claimed as new is:

1. A power supply circuit to provide current at a constant potential from an unregulated source to an output and to limit the output current to a maximum and to disconnect said source from said output at said maximum output current, said circuit comprising: a control transistor having a base and a load current path, said load current path being connected between said unregulated source and said output to control said output current in response to current flow through said base; a current limiter transistor having a load current path connected to said base of said control transistor and having a base biased to present a minimum impedance to current from said base of said control transistor when said load current through said control transistor is less than said maximum and to pass a constant current from said base of said control transistor when said load current through said control transistor is said maximum; an amplifier transistor having a load current path connected to conduct current from said load current path of said current limiter transistor to said unregulated source and having a base; a comparator coupled to said output and connected to receive current from said base of said amplifier transistor in response to a change of said potential at said output, said comparator also having a control input connected to prevent current flow from the base of said amplifier transistor; a source of reference potential; and a voltage sensor transistor having a base connected to said source of reference potential and having a load current path connected between said output and said comparator control input to pass the potential at said output to said control input to prevent current flow through said amplifier ransistor, whereby said potential at said output is constant when said output current is below said maximum but when said output current increases to said maximum, said current limiter transistor acts to limit output current by maintaining a constant current from the base of said control transistor and said voltage sensor transistor acts to disconnect said source from said output.

2. A power supply circuit to provide current at a constant potential from an unregulated source to an output and to limit the output current to a maximum and to disconnect said source from said output at said maximum output current, said circuit comprising: a control transistor having a base and a load current path, said load current path being connected between said unregulated source and said output to control said output current in response to current flow through said base; a current limiter transistor having a load current path connected to said base of said control transistor and having a base biased to present a minimum impedance to current from said base of said control transistor when said load current through said control transistor is less than said maximum and to pass a constant current from said base of said control transistor when said load current through said control transistor is said maximum; a comparator coupled to said output and coupled to said load current path of said current limited transistor to respond to a change of said potential at said output, said comparator also having a control input connected to prevent current flow from said load current path of said current limiter transistor; a source of reference potential; and a voltage sensor transistor having a base connected to said source of reference potential and having a load current path connected between said output and said comparator control input to pass the potential at said output to said control input to prevent current flow through said load current path of said current limiter transistor, whereby said potential at said output is constant when said output current is below said maximum but when said output current increases to maximum, said current limiter transistor acts to limit output current by maintaining a constant current from the base of said control transistor and said voltage sensor transistor acts to disconnect said source from said output.

3. A power supply connected from an unregulated source to a varying load to provide a constant potential thereto and having a control element including a control terminal, said control element varying in impedance to load current wtih variation of load current and with variation of current through said control terminal, said power supply comprising: current limiting means connected to said control terminal to limit current from said control terminal to a fixed value, thereby causing the variation of impedance in response to variation of load current of said control element to maintain a constant load current; gating means connected to said current limiting means to control current passed through said current limiting means from said control terminal; a comparator connected to control said gating means and coupled to the input of said load to respond to the potential at the input to said load for providing a control signal to control said gating means, said comparator having an input arranged to prevent application of said control signal to said gating means; and reference means connected between said input to said load and said input of said comparator, to respond and to pass an increased potential at the input of said load to said input of said comparator, thus causing said comparator to act to prevent application of said control signal to said gating means, said reference means responding as said potential at said input of said load increases to a predetermined potential, whereby said current limiting means passes a constant current to cause said control element to limit said load current and to allow an increase of said potential at said input of said load and said reference means responds to prevent application of said control signal to said gating means, causing the impedance of said control element to be greatly increased.

4. A circuit for supplying power at a constant output potential from unregulated source to a varying load and for providing overload protection at a maximum current, said circuit comprising: a variable impedance element connected to control the impedance to load current passing between said source and said load and having a control terminal, said element varying in said impedance as the current through said control terminal varies and as the load current varies; a current limiter connected to pass current through said control terminal; a first source of reference potential; a feedback loop coupled to the output of said variable impedance element; means to control current received from said current limiter connected between said current limiter and said feedback loop, said means being coupled to said first source of reference potential to provide a controlled current source to said current limiter in order to maintain said constant potential at said output of said variable impedance element, said means also having a bias input arranged to render said means inoperative; an adjustable reference potential connected to said current limiter to bias said current limiter to pass a constant current when said load current reaches said maximum, thus causing the varying impedance to load current of said variable impedance element to limit said load current to said maximum and allowing said output potential to increase; a second source of reference potential; a voltage sensor connected between the output of said variable impedance element and said second source of reference potential and connected to said bias input of said means to control current to render said means inoperative when said output potential increases, thus preventing current from passing through said control terminal and increasing the impedance of said impedance element to protect said circuit.

5. A circuit to supply current to a load at a constant potential from an unregulated source and to provide fast disconnection of said source from said load when said current exceeds a maximum, said circuit comprising: a variable impedance element connected between said voltage source and said load and having a control terminal, said impedance element varying in static impedance with the current through said control terminal and varying in static impedance with said load current to maintain a constant load current when said current through said control terminal is constant; an adjustable bias potential; a current limiter coupled to said control terminal to pass current from said control terminal and connected to said adjustable bias potential for adjusting the maximum load current, said current limiter acting as a closed circuit when said load current is below maximum and acting to pass a constant current from said control terminal when said load current is maximum; a current controlling element connected to receive current passed from said current limiter; a comparator connected to respond to the potential at the input of said load to control the current through said variable impedance element so as to maintain a constant potential at said input of said load; a first and a second source of reference potential, said first source of reference potential being connected to said comparator to maintain said comparator in operation; a voltage sensor connected between said input of said load and said second source of reference potential and acting to apply said potential at said input of said load to said comparator to overcome said first potential and to bias said comparator out of operation when said potential at said input of said load equals said second reference potential, whereby when said current limiter passes constant current to cause said variation of impedance with variation of load current to maintain a constant load current, a resulting increase of potential at the input of said load causes said voltage sensor to respond to to render said comparator inoperative, thus increasing the impedance of said impedance element to provide fast disconnection of said source from said load.

6. A power supply to provide a constant potential at a varying load current from an unregulated source to a load and to disconnect said source from said load at a desired maximum current, said power supply comprising: an impedance element connected between said source and said load and having a control terminal, the impedance to load current varying in response to variations of current through said control terminal and, with a constant current through said control terminal, the impedance to load current varying in response to variations of load current so as to maintain a constant load current; a current limiting transistor having an emitter, a collector, and a base, said collector being connected to said control terminal; a first source of reference potential connected to the base of said current limiting transistor to bias said current limiting transistor to provide a low impedance to current when less than said maximum current passes through said impedance element and to bias said current limiting transistor into constant current conduction when said maximum current passes through said impedance element to said load thereby causing said impedance element to maintain a constant load current; an amplifier transistor having an emitter, a collector, and a base, said emitter being connected to the emitter of said current limiting transistor and said collector being connected to said unregulated source to pass current thereto from said control terminal of said impedance element; a second source of reference potential; comparator means connected to supply current to the base of said amplifier transistor and connected to the input of said load to control current through said base to maintain a constant voltage at said input of said load, said comparator means having a biasing input; and means connected to said second source of reference potential and having a voltage sensing input connected to said input of said load to apply the potential at the input of said load to said biasing input to prevent passing of said current from the base of said amplifier transistor in response to an increased potential at said input of said load, matching said second source of reference potential, thus preventing current flow through said control terminal and increasing the impedance of said impedance element to disconnect said source from said load.

7. A power supply connected to an unregulated source for providing a varying current at a fixed potential to a load and for being disconnected from said load at a desired maximum current, said power supply comprising: a control transistor having an emitter, a collector, and a base, said emitter and collector connected between said unregulated source and said load; a current limiter transistor having an emitter, a collector, and a base, said collector connected to said base of said control transistor; a first source of reference potential connected to the base of said current limiter transistor to bias the current limiter transistor into constant current conduction when said load current is said maximum thus causing said control transistor to maintain a constant load current; an amplifier transistor having an emitter, a collector and a base, said emitter connected to said emitter of said current limiting transistor and said collector connected to said unregulated source; a first comparator transistor having an emitter, a base and a collector, said collector connected to the base of said amplifier transistor to shunt out current from said base, and said base connected to the input of said load to be controlled by the potential at said input of said load; said first comparator transistor acting to maintain a fixed potential at the input to said load; a current source connected to the emitter of said first comparator transistor; a second comparator transistor having an emitter, a base, and a collector, said collector connected to said base of said amplifier transistor to conduct current from the base of said amplifier transistor and connected to said collector of said first comparator transistor to conduct current from the collector of said first comparator transistor; a second source of reference potential connected to the base of said second comparator transistor; a third source of reference potential connected to the emitter of said second comparator transistor to maintain said second comparator transistor in constant current conduction; a fourth source of reference potential; a voltage sensor transistor having an emitter, a base and a collector, said emitter connected to the input of said load, said base connected to said fourth source of reference potential and said collector connected to said emitter of said second comparator transistor, said voltage sensor transistor being biased into conduction by an increase of said potential at said input of said load to apply said potential to the emitter of said second comparator transistor, whereby when said current limiting transistor conducts constant current, said increase of potential at said input of said load causes said second comparator transistor to be biased out of conduction, thus preventing current from passing through said control terminal of said control transistor and effectively disconnecting said power supply from said load.

8. A circuit for supplying power to a load at a constant potential with a varying load current and for protecting said load against greater than a maximum current, said circuit having an unregulated source, a control element connected to control the impedance between said source and said load and having a control terminal, said impedance to load current varying with current through said control terminal and varying with load current, a comparator having an output and coupled to the input of said load to respond to said potential at said input of said load to control current passed to said load, and having a control input, an amplifier transistor having an emitter, a collector, and a base, said base being connected to said comparator output and said collector being connected to said unregulated source, the combination with an overload protection circuit comprising: a first and a second potential source, a current limiting transistor having an emitter, a collector and a base, said collector being connected to said control terminal, said emitter being connected to said emitter of said amplifier transistor, and said base being connected to said first potential source, said current limiting transistor passing constant current when said load current through said control element reaches said maximum; a voltage sensing transistor having an emiter, a base, and a collector, said emitter being connected to the input of said load, said base being connected to said second potential source, and said collector being connected to said control input of said comparator to prevent current from passing through said comparator output and preventing current from passing through said control terminal of said control element when said potential at said input of said load equals said potential at said second potential source, whereby said maximum load current causes said current limiting transistor to operate in its constant current condition causing said control element to maintain a constant load current and resulting in said voltage sensing transistor acting to disconnect said source from said load.

References Cited in the file of this patent

UNITED STATES PATENTS

| | | |
|---|---|---|
| 2,697,811 | Deming | Dec. 21, 1954 |
| 2,698,416 | Sherr | Dec. 28, 1954 |
| 2,832,900 | Ford | Apr. 29, 1958 |
| 2,922,945 | Norris et al. | Jan. 26, 1960 |
| 2,925,548 | Scherer | Feb. 16, 1960 |